United States Patent
Avner

(10) Patent No.: US 9,979,576 B2
(45) Date of Patent: May 22, 2018

(54) DRIFT ROBUST CONVOLUTIONAL INDUCED RECEPTION SCHEME WITH NOISE PREDICTION

(71) Applicant: Apple Inc., Cupertino, CA (US)

(72) Inventor: Yuval Avner, Haifa (IL)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/454,172

(22) Filed: Mar. 9, 2017

(65) Prior Publication Data

US 2018/0006857 A1    Jan. 4, 2018

Related U.S. Application Data

(63) Continuation-in-part of application No. 15/196,275, filed on Jun. 29, 2016, now Pat. No. 9,860,095.

(51) Int. Cl.
*H04L 27/22* (2006.01)
*H04W 4/00* (2018.01)

(52) U.S. Cl.
CPC ............. *H04L 27/22* (2013.01); *H04W 4/008* (2013.01)

(58) Field of Classification Search
CPC .................... H04L 1/0054; H04L 1/006; H04L 2025/0349; H04L 27/2273; H04L 27/266; H04L 2027/0069; H04L 2027/0071; H04L 2027/0081; H04L 25/03019; H04L 27/01; H04L 27/2649; H04L 27/22
USPC .................................................. 375/340–341
See application file for complete search history.

(56) References Cited

U.S. PATENT DOCUMENTS

| | | | |
|---|---|---|---|
| 5,450,446 A | 9/1995 | Tanaka et al. | |
| 6,553,518 B1 | 4/2003 | Ware et al. | |
| 6,754,263 B1 * | 6/2004 | Kakura | H04L 25/03178 375/232 |
| 7,418,034 B2 | 8/2008 | Xia et al. | |
| 7,613,238 B2 | 11/2009 | Chang | |
| 7,903,769 B2 | 3/2011 | Wallen et al. | |
| 9,059,835 B1 | 6/2015 | Venkatesh et al. | |
| 9,306,781 B2 | 4/2016 | Shin et al. | |
| 2002/0174242 A1 * | 11/2002 | Hindie | H04M 11/066 709/231 |
| 2004/0086070 A1 * | 5/2004 | Sachse | H04L 27/0014 375/375 |
| 2006/0064628 A1 * | 3/2006 | Stein | H03M 13/6343 714/795 |
| 2009/0052516 A1 * | 2/2009 | Chen | H04L 25/0232 375/232 |
| 2009/0238255 A1 | 9/2009 | Chau et al. | |
| 2010/0034253 A1 | 2/2010 | Cohen | |
| 2010/0074310 A1 | 3/2010 | Roo et al. | |
| 2011/0033009 A1 | 2/2011 | Betts | |

* cited by examiner

*Primary Examiner* — Emmanuel Bayard
(74) *Attorney, Agent, or Firm* — Meyertons Hood Kivlin Kowert & Goetzel, P.C.; Jeffrey C. Hood

(57) ABSTRACT

This document describes techniques for decoding a convolutionally coded signal using a trellis decoder in a drift robust manner. A convolutionally coded and differentially modulated signal may be received. The signal may be decoded using a trellis. A noise prediction loop may be used to reduce noise characteristics of the signal. A frequency offset estimation loop may be used to reduce a frequency offset drift of the signal. The noise prediction loop and the frequency offset estimation loop may be applied at each branch of the trellis.

20 Claims, 15 Drawing Sheets

DRIFT ROBUST CONVOLUTIONAL INDUCED RECEPTION SCHEME WITH NOISE PREDICTION

PRIORITY INFORMATION

This application is a continuation-in-part of U.S. patent application Ser. No. 15/196,275, entitled "Drift Robust Non-Coherent Demodulation Scheme," filed Jun. 29, 2016, which is hereby incorporated by reference in its entirety as though fully and completely set forth herein.

FIELD

The present disclosure relates to wireless devices, including to techniques for wireless devices to perform a scheme for drift robust convolutional induced reception with noise prediction, such as for enhanced data rate Bluetooth communications.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), Bluetooth, and others. Bluetooth is a family of wireless communication technologies typically used for short-range communication. The Bluetooth family encompasses 'Classic Bluetooth' (also referred to herein as "Classic BT" or simply "BT") as well as 'Bluetooth Low Energy' (referred to herein as "BLE").

Differential modulation techniques, including certain differential phase shift keying techniques that can be used when performing BT communication, may make use of the difference between successive symbols transmitted in a signal to convey information. Because the data in such modulation techniques underlies the difference between symbols, it is generally possible to utilize non-coherent demodulation techniques to decode differentially modulated signals. Non-coherent demodulation may be relatively simple to implement, but can suffer from lower effective signal strength relative to coherent demodulation.

SUMMARY

Embodiments are presented herein of systems, apparatuses, and methods for wireless devices to perform drift robust convolutional induced reception and decoding, with noise prediction, of a differentially modulated signal.

According to the techniques described herein, a trellis decoder may be used to decode a convolutionally coded differentially modulated signal. Noise prediction and frequency offset estimation loops may be applied at each branch of the trellis, which may whiten noise characteristics as well as provide robustness to drift. As part of the process for applying the noise prediction and frequency offset estimation to the trellis decoder in an integrated manner (e.g., in order to ensure continuity of the noise prediction and frequency offset estimation filtering chains), at each state of the trellis, along with a surviving bit sequence associated with the state, surviving state information for the noise prediction and frequency offset estimation loops may be determined.

The use of such filtering chains in the trellis may, at least in some embodiments, have the potential to increase the sensitivity of the demodulation and improve the decoding capability for convolutionally coded differentially modulated signals while also providing robustness against frequency drift effects.

The techniques described herein may be implemented in and/or used with a number of different types of devices, including but not limited to cellular phones, tablet computers, portable computers, desktop computers, accessory and/or wearable computing devices, portable media players, remote controls, wireless speakers, set top box devices, television and/or media systems, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
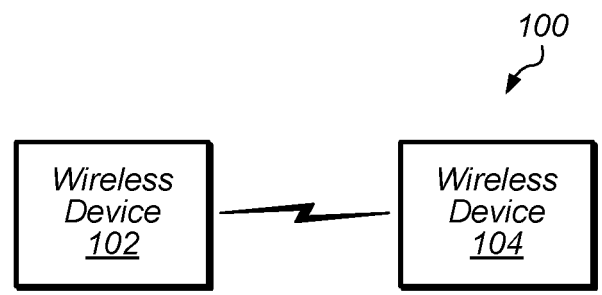
FIGS. 1-3 illustrate exemplary wireless communication systems.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Terms

The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
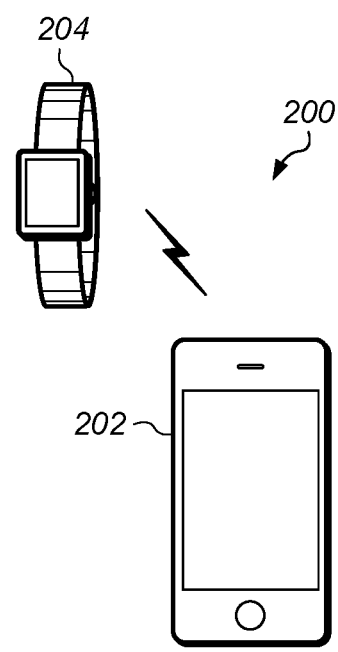
Figure 3:
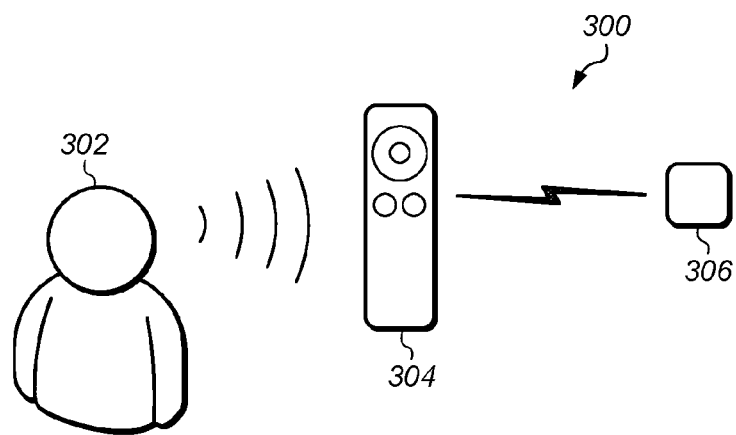

FIGS. 1-3—Communication System

FIG. 1 illustrates an exemplary (and simplified) wireless communication system 100 in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device 104. The first wireless device 102 and the second wireless device 104 may communicate wirelessly using at least one wireless communication technique that utilizes differential modulation.

As one possibility, the first wireless device 102 and the second wireless device 104 may communicate using Bluetooth (BT) wireless communication and/or techniques based on BT wireless communication. In such a context, the first wireless device 102 may be referred to as the master (or "central") device 102 while the second wireless device 104 may be referred to as the slave (or "peripheral") device 104 (e.g., the 'master' and 'slave' designations may be specific to the roles of the devices 102, 104 with respect to BT communication). One or both of the master device 102 and the slave device 104 may also be capable of communicating via one or more additional wireless communication protocols, such as any of Bluetooth Low Energy (also referred to as "BLE"), IEEE 802.11 (Wi-Fi), near field communication (NFC), GSM, UMTS (WCDMA, TDSCDMA), LTE, LTE-Advanced (LTE-A), 3GPP2 CDMA2000 (e.g., 1×RTT, 1×EV-DO, HRPD, eHRPD), GPS, etc.

As shown, as one possibility a single master (e.g., primary) device 102 may communicate with a single slave (e.g., secondary) device 104 at a particular time. Note that it may also be possible for a master device 102 to communicate with multiple slave devices 104. The master device 102 may be any of a variety of types of devices. As one possibility, the master device 102 may be a substantially portable wireless user equipment (UE) device, such as a smart phone, hand-held device, a wearable device, a tablet, or virtually any type of wireless device. As another possibility, the master device 102 may be a substantially stationary device, such as a set top box, media player (e.g., an audio or audiovisual device), gaming console, or any of a variety of other types of device.

The slave device 104 may also be any of various types of devices. In some cases, the slave device 104 may be a device with a relatively low power usage profile, e.g., which is designed to operate for relatively long periods of time before replacing or recharging its power source. Some examples might include hearing aids, speakers, remote control devices, microphones, headsets, various types of sensors, watches and other wearable computing devices, etc. Note that some devices may be configured to act as either a master device or a slave device, while others may be configured to act only as a master device, or only as a slave device.

Each of the master device 102 and the slave device 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The master device 102 and/or the slave device 104 may perform any of the method embodiments described herein, or any portion of any of the method embodiments described herein, using any or all of such components.

Each of the master device 102 and the slave device 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or CDMA2000 1×RTT, and separate radios for communicating using each of Wi-Fi and Bluetooth. Other configurations are also possible.

The slave device 104 may include one or more microphones and/or one or more speakers, e.g., in order to receive and/or render audio. For example, the slave device 104 might include one or more microphones for picking up audio in order to provide audio input to the master device 102, one or more speakers for rendering audio received as audio output from the master device 102, or may include both microphone and speaker for use in conjunction with any of input, output, or bi-directional communication with the master device 102. The master device 102 may similarly include one or more microphones and/or one or more speakers. Note additionally that aspects of the present disclosure may also be implemented in scenarios in which one or both of the master device 102 and the slave device 104 do not include speakers and/or microphones; for example, while audio data may commonly be communicated using BT communication, any of various other types of data may also or alternatively be communicated using BT and other wireless communication technologies.

As previously noted, aspects of this disclosure may be implemented in conjunction with the wireless communication system of FIG. 1. For example, according to some embodiments, wireless devices 102, 104 may communicate using at least one wireless communication technique that utilizes convolutional coding in conjunction with differential modulation, and one or both of the wireless devices 102, 104 may implement some or all of those features described subsequently herein with respect to FIGS. 6-19, such as performing trellis decoding of a convolutionally coded differentially modulated signal with noise prediction and frequency offset estimation applied at each branch of the trellis. By utilizing such techniques (and/or other techniques described herein), the wireless device(s) may (at least according to some embodiments) be able to advantageously obtain the gain benefits of noise prediction without (or with less) susceptibility to frequency offset effects when decoding a convolutionally coded signal.

As a further example of a possible wireless communication system in which aspects of this disclosure may be implemented, FIG. 2 illustrates a system 200 in which a wireless user equipment (UE) device 202 (e.g., a smart phone, acting as a central or master device) is in communication with a smart watch 204 (acting as a peripheral or slave device). In such an example implementation, the UE 202 may provide data (e.g., audio data, video data, configuration data, synchronization data, and/or any of various other types of data) to the smart watch 204, and/or may receive data from the smart watch 204, via BT communication as described herein.

The wireless devices of the communication system of FIG. 2 may also be configured to communicate using at least one wireless communication technique that utilizes convolutional coding and differential modulation. Accordingly (e.g., to obtain the gain benefits of noise prediction with reduced susceptibility to frequency offset effects when decoding a convolutionally coded differentially modulated signal), one or both of the wireless devices 202, 204 may implement some or all of those features described subsequently herein with respect to FIGS. 6-19, such as performing trellis decoding of a convolutionally coded differentially modulated signal with noise prediction and frequency offset estimation applied at each branch of the trellis.

As another example of a possible wireless communication system in which aspects of this disclosure may be implemented, FIG. 3 illustrates a system 300 in which a remote control device 304 (acting as a peripheral or slave device) is in communication with a set top box 306 (acting as a master or central device). In such an exemplary implementation, the remote control 304 may receive audio signals (e.g., voice commands for controlling the set top box 306) from a user 302 via a microphone, and may provide audio data corresponding to those audio signals as an input audio stream to the set top box 306 via BT communication as described herein. In some instances, once the audio data is received at the set top box 306, the following may be performed: the set top box 306 may communicate the audio data to a server (not depicted in FIG. 3) via the Internet for processing; the server may analyze the received audio data and determine that the audio data corresponds to a command that can be executed by the set top box 306; the server may transmit one or more messages back to the set top box 306 that indicate the command; and then the set top box 306 may execute the command.

Alternatively or additionally, the set top box 306 of FIG. 3 may execute a videoconferencing application. In such a scenario, the remote control 304 may receive audio signals from the user 302 via a microphone, and may provide audio data corresponding to those signals as an input audio stream to the set top box 306 via BT communication as described herein. Upon receiving the input audio stream, the set top box 306 may transmit the audio data to one or more other endpoints (not depicted in FIG. 3) and/or intermediate servers (not depicted in FIG. 3) involved in the videoconference via the Internet.

As another variation on the wireless communication system of FIG. 3, instead of a set top box 306 as shown in FIG. 3, the wireless communication system may include a BT-capable television system that, in addition to performing functionality performed by a television system (e.g. rendering video data onto a display, and so on), includes components that perform the functionality described above as performed by the set top box 306.

Similar to the wireless devices of the systems of FIGS. 1-2, the wireless devices 304, 306 of FIG. 3 may be configured to communicate using at least one wireless communication technique that utilizes differential modulation, and may implement trellis decoding of a convolutionally coded differentially modulated signal with noise prediction and frequency offset estimation applied at each branch of the trellis and/or any other features described herein with respect to FIGS. 6-19.

While the exemplary wireless communication systems illustrated in FIGS. 1-3 represent possible scenarios in which aspects of the present disclosure may be implemented, it should be recognized that the techniques described herein may also or alternatively be implemented in a variety of alternate scenarios, in conjunction with a variety of other device combinations, as will be apparent to those skilled in the art.

Figure 4:
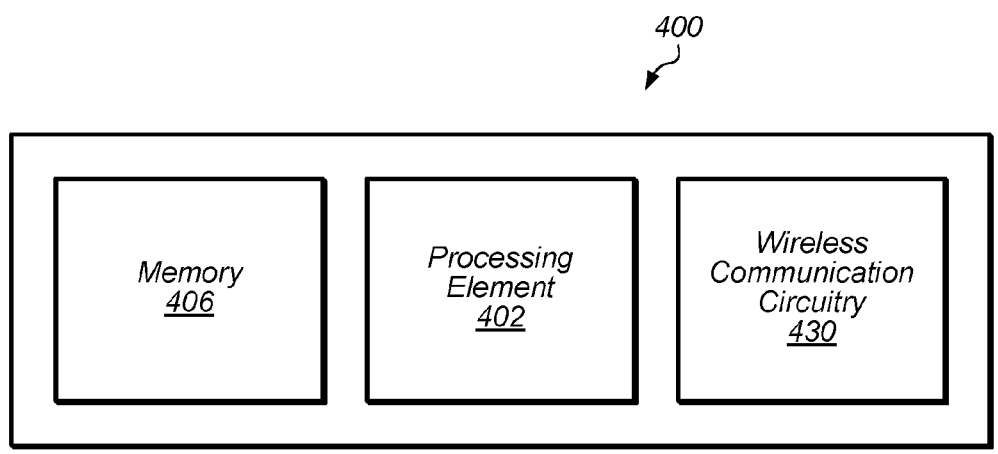
FIGS. 4-5 illustrate block diagrams of exemplary wireless devices.
Figure 5:
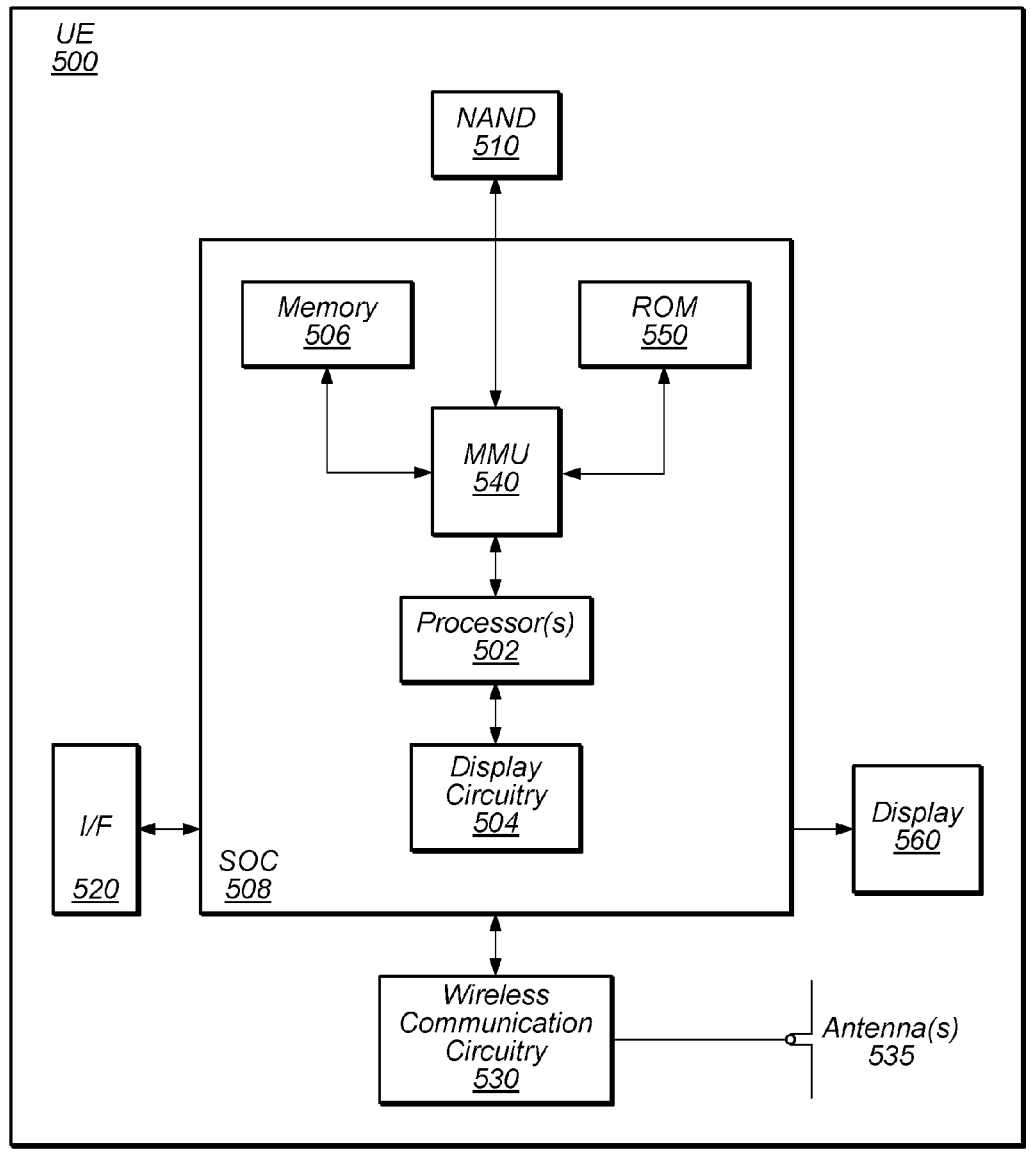

FIGS. 4-5—Exemplary Device Block Diagrams

FIG. 4 illustrates an exemplary wireless device 400 that may be configured for use in conjunction with various aspects of the present disclosure. The device 400 may be any of a variety of types of device and may be configured to perform any of a variety of types of functionality. The device 400 may be a substantially portable device (a mobile device), such as a mobile phone, a personal productivity device, a computer or a tablet, a handheld gaming console, a portable media player, etc. Alternatively, the device 400 may be a substantially stationary device, such as a desktop computer, set top box, television, or other type of substantially stationary device. The device 400 may be configured to operate as a master or central device in a Bluetooth wireless communication scheme, and/or may be configured to operate as a slave or peripheral device in a Bluetooth wireless communication scheme.

As shown, the device 400 may include a processing element 402. The processing element may include or be coupled to one or more memory elements. For example, the device 400 may include one or more memory media (e.g., memory 406), which may include any of a variety of types of memory and may serve any of a variety of functions. For example, memory 406 could be RAM serving as a system memory for processing element 402. Other types and functions are also possible.

Additionally, the device 400 may include wireless communication circuitry 430. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 430 may include its own processing element (e.g., a baseband processor), e.g., in addition to the processing element 402. For example, the processing element 402 might be an 'application processor' whose primary function may be to support application layer operations in the device 400, while the wireless communication circuitry 430 might be a 'baseband processor' whose primary function may be to support baseband layer operations (e.g., to facilitate wireless communication between the device 400 and other devices) in the device 400. In other words, in some cases the device 400 may include multiple processing elements (e.g., may be a multi-processor device). Other configurations (e.g., instead of or in addition to an application processor/baseband processor configuration) utilizing a multi-processor architecture are also possible.

The device 400 may additionally include any of a variety of other components (not shown) for implementing device functionality, depending on the intended functionality of the device 106, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 400, such as processing element 402, memory 406, and wireless communication circuitry 430, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 402, peripheral interfaces for communication with peripheral components within or external to device 400, etc.) may also be provided as part of device 400.

The device 400 (e.g., wireless communication circuitry 430 in conjunction with processing element 402, memory 406, and/or other components of device 400) may be configured to implement features for performing drift robust convolutional induced reception with noise prediction. For example, the wireless device 400 may represent an example of a possible wireless device such as illustrated in any of FIGS. 1-3, and may be capable of performing trellis decoding of a convolutionally coded differentially modulated signal with noise prediction and frequency offset estimation applied at each branch of the trellis and/or other features described herein with respect to FIGS. 6-19.

FIG. 5 is an exemplary block diagram illustrating details of a UE 500, which may be one possible exemplary implementation of the device 400 illustrated in FIG. 4. As shown, the UE 500 may include a system on chip (SOC) 508, which may include portions for various purposes. For example, as shown, the SOC 508 may include processor(s) 502 which may execute program instructions for the UE 500 and display circuitry 504 which may perform graphics processing and provide display signals to the display 560. The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, wireless communication circuitry 530, connector I/F 520, and/or display 560. The MMU 540 may be configured to perform memory protection and page table translation or set up. In some embodiments, the MMU 540 may be included as a portion of the processor(s) 502.

As shown, the SOC 508 may be coupled to various other circuits of the UE 500. For example, the UE 500 may include various types of memory (e.g., including NAND flash 510), a connector interface 520 (e.g., for coupling to a computer system, dock, charging station, etc.), the display 560, and wireless communication circuitry 530 (e.g., for LTE, LTE-A, CDMA2000, Bluetooth, Wi-Fi, GPS, etc.).

The UE 500 may be configured to communicate wirelessly using multiple wireless communication standards. In such instances, the wireless communication circuitry 530 may include radio components which are shared between multiple wireless communication standards and/or radio components which are configured exclusively for use according to a single wireless communication standard. As shown, the UE device 500 may include at least one antenna (and possibly multiple antennas, e.g., for MIMO and/or for implementing different wireless communication technologies, among various possibilities), for performing wireless communication with base stations, access points, and/or other devices. For example, the UE device 500 may use antenna(s) 535 to perform the wireless communication.

The UE 500 may also include and/or be configured for use with one or more user interface elements. The user interface elements may include any of various elements, such as display 560 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 500 may include hardware and software components for implementing features for performing drift robust convolutional induced reception with noise prediction. For example, the UE 500 may represent an example of a possible wireless device such as illustrated in any of FIGS. 1-3, and may be capable of performing trellis decoding of a convolutionally coded differentially modulated signal with noise prediction and frequency offset estimation applied at each branch of the trellis and/or other features described herein with respect to FIGS. 6-19. The wireless communication circuitry 530 of the UE device 500 may be configured to implement part or all of the features described herein, e.g., using various circuitry components of the wireless communication circuitry. Alternatively (or in addition), the wireless communication circuitry 530 of the UE device 500, in conjunction with one or more of the other components 502, 504, 506, 508, 510, 520, 535, 540, 550, 560, may be configured to implement part or all of the features described herein, such as the features described herein with reference to any or all of FIGS. 6-19.

Figure 6:
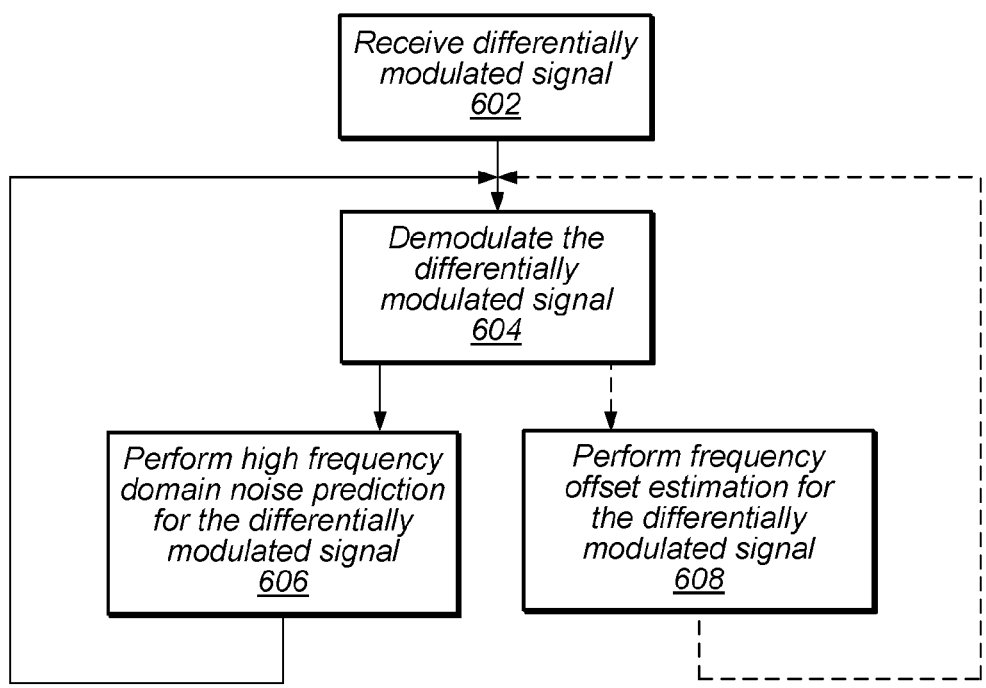
FIG. 6 is a flowchart diagram illustrating an exemplary method for performing non-coherent demodulation for non-coded transmissions in a drift robust manner.

FIG. 6—Drift Robust Non-Coherent Demodulation Flowchart

Differential modulation techniques may make use of the difference between successive symbols transmitted in a signal to convey information, e.g., in contrast to coherent modulation techniques that may rely on a comparison of the transmitted signal with a reference signal known by both transmitter and receiver to convey information. Differential modulation techniques are employed in a number of wireless communication technologies, among possible applications. For example, as one possibility, the differentially modulated signal may be a Bluetooth signal, such as an enhanced data rate 2 (EDR2) signal modulated using 4-differential quadrature phase shift keying (4DQPSK), or an enhanced data rate 3 (EDR3) signal modulated using 8-differential phase shift keying (8DPSK). Other types of differentially modulated signals are also possible.

It may be possible for a coherent or non-coherent approach to be used for demodulation of a diffentially modulated signal. Coherent demodulation may include performing phase acquisition, which may be more complex than the phase discrimination on which non-coherent demodulation may be based. In addition to avoiding the need for phase acquisition (and thus potentially allowing for a more simple implementation), non-coherent demodulation may also be relatively robust to frequency offset compared to coherent demodulation. However, absent any mitigating factors, non-coherent demodulation may suffer from a gain loss (e.g., approximately 2.5 dB, in some instances) relative to coherent decoding.

One possibility for regaining the loss when employing non-coherent demodulation may include utilizing a noise prediction scheme. However, such noise prediction mechanisms can have the potential to be sensitive to constant frequency offset and frequency offset drift (e.g., translated to additive DC or carrying sine wave in the differentiated phase domain). As a result, existing differential demodulation techniques may be forced to accept a trade off between decreased gain and susceptibility to frequency offset effects. Accordingly, it would be desirable, at least in some instances, to provide techniques that are capable of benefitting from noise prediction gain while preserving robustness to constant frequency offset and/or frequency offset drift.

FIG. 6 is a flowchart diagram illustrating an example method for performing differential demodulation in a drift robust manner while also obtaining noise prediction gain. The method of FIG. 6 may be implemented by a wireless user equipment (UE) device or other device capable of performing communication involving differential demodulation, such as a device capable of performing enhanced data rate (EDR) BT communication. The method shown in FIG. 6 may be used in conjunction with any of the computer systems or devices shown in the above Figures, among other devices. Some of the method elements shown may be performed concurrently, in a different order than shown, substituted for by other elements, or may be omitted. Additional method elements may also be performed as desired. As shown, the method may operate as follows.

A differentially modulated signal may be received (602). The differentially modulated signal may be modulated according to any of a variety of modulation techniques. For example, the differentially modulated signal may be a Bluetooth (or Bluetooth based) signal, such as a 4QDPSK EDR2 signal or a 8DPSK EDR3 signal, among various possibilities.

The differentially modulated signal may include multiple symbols, e.g., received successively over time. For example, EDR2 and EDR3 schemes may specify communication of 1M symbols per second. Each symbol may represent one or more (e.g., depending on the modulation scheme) bit values, for example using the angular phase of the symbol relative to the previous symbol received.

The differentially modulated signal may be demodulated (604), e.g., using non-coherent demodulation. Demodulating the differentially modulated signal may include (e.g., for each symbol of the differentially modulated signal subsequent to the first symbol) subtracting a previous symbol of the differentially modulated signal from the current symbol of the differentially modulated signal. The angle of difference between the two symbols (i.e., the angular domain result of the subtraction) may be compared with a constellation diagram indicating possible ideal sample values corresponding to possible decoded symbol bits according to the modulation scheme in use. A 'slicer' may make a decision matching the angular domain result with the closest available constellation symbol based on this comparison. This ideal symbol/angular domain result, and/or the symbol value/bits associated with this ideal symbol/angular domain result, may be output from the slicer.

In order to obtain noise prediction benefits while preserving robustness to frequency offset effects, one or more feedback loops may be used in conjunction with the demodulation of the differentially modulated signal. As one such feedback loop, a noise prediction loop for performing noise prediction in the high frequency domain may be used (606).

The noise prediction loop may receive an estimated error signal associated with the current symbol of the differentially modulated signal, perform noise prediction for the subsequent symbol of the differentially modulated signal based on the estimated error signal associated with the current symbol, and generate a signal configured to modify the subsequent symbol to mitigate (or reduce) noise effects in that symbol. For example, the noise prediction scheme may act to 'whiten' the noise in that symbol, i.e., to flatten the noise levels across the spectrum of that symbol. The signal configured to modify the subsequent symbol may be combined with the subsequent symbol (e.g., in the differentiated phase domain) of the differentially modulated signal before the subsequent symbol is sliced.

The estimated error signal used by the noise prediction loop may be calculated as (or more generally may be based upon) a difference between the angular domain result of the subtraction of the previous symbol from the current symbol and the ideal angular domain result selected by the slicer for the current symbol. The estimated error signal may further be high-pass filtered (e.g., using a high-pass filter) before noise prediction is performed. This may result in the noise prediction being performed in the high frequency domain (e.g., rather than the low frequency domain or across the entire frequency range of the signal), which may (at least in some instances) help avoid increasing the susceptibility of the demodulation process to constant frequency offset and/or frequency offset drift.

For example, consider the differentially modulated signal in the differentiated phase domain. It may be the case that the constant frequency offset and frequency offset drift typically occur in the low frequency domain, while noise predominantly occurs in the high frequency domain. As a result, it may be possible to gain the benefit of noise prediction without exacerbating frequency offset susceptibility by utilizing a high pass filter to perform noise prediction in the high frequency domain.

As another possible feedback loop, a frequency offset estimation loop for estimating frequency offset effects for the differentially modulated signal may be used (608), if desired. For example, while performing the noise prediction in the high frequency domain may reduce the impact of frequency offset effects from the noise prediction process, an additional frequency offset estimation loop may further reduce or nullify the effect of constant frequency offset and/or frequency offset drift when performing non-coherent demodulation of the differentially modulated signal.

The frequency offset estimation loop may also receive the error signal associated with the current symbol of the differentially modulated signal. The frequency offset estimation loop may perform estimation of constant frequency offset and/or frequency offset drift, and may generate a signal configured to modify the subsequent symbol to mitigate frequency offset effects in that symbol. The signal configured to modify the subsequent symbol may be combined with the subsequent symbol (e.g., in the differentiated phase domain) of the differentially modulated signal before the subsequent symbol is sliced.

Note that one or more convergence conditions may be used in conjunction with either or both of the noise prediction loop and the frequency offset estimation loop, as desired. For example, a timer (or multiple timers) may be used to cause the noise prediction loop and/or the frequency offset estimation loop to wait a certain amount of time after receiving the error signal for the current symbol prior to modifying the subsequent symbol, e.g., in order to allow sufficient time for the noise prediction and/or frequency offset estimation to converge to stable results.

Note further that the techniques described herein may be used in succession to decode each successive symbol of the differentially modulated signal in turn and thus to produce a bit stream at the device receiving the differentially modulated signal. At least according to some embodiments, the bit stream may be subject to fewer errors and/or may be produced with less power consumption than might otherwise occur, as a result of utilizing noise prediction performed in the high frequency domain (and potentially as a result of utilizing frequency offset estimation) to obtain the noise prediction gain while preserving robustness to frequency offset effects.

FIGS. 7-11

FIGS. 7-11 and the description thereof are provided by way of example, and are not intended to be limiting to the disclosure as a whole. Numerous alternatives to and variations of the details provided herein below are possible and should be considered within the scope of the present disclosure.

Figure 7:
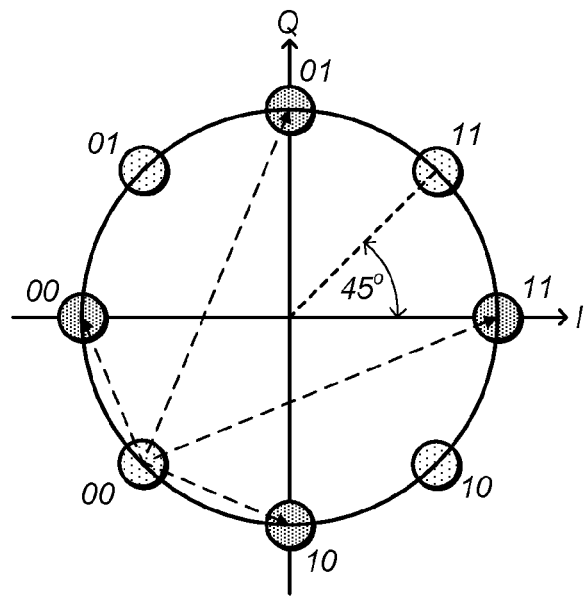
FIGS. 7-8 illustrate exemplary possible differential modulation constellations for non-coded transmissions.
Figure 8:
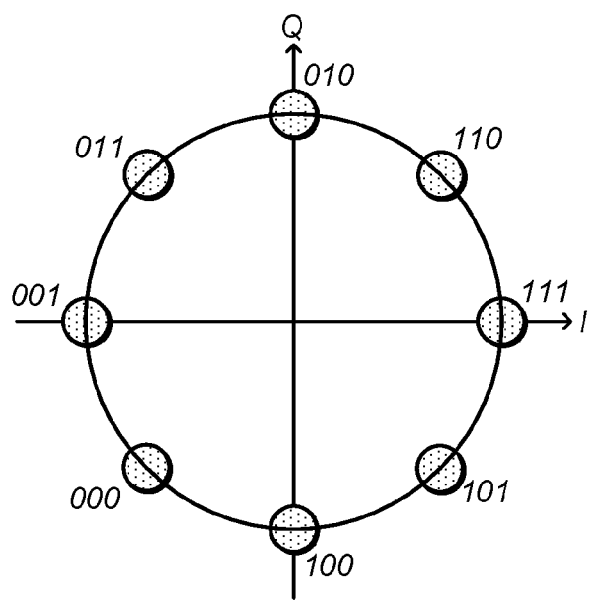

FIGS. 7-8 are constellation diagrams illustrating possible differential modulation constellations. FIG. 7 illustrates an example constellation diagram that may be used in conjunction with 4QDPSK, while FIG. 8 illustrates an example constellation diagram that may be used in conjunction with 8DPSK. As shown, in each case the value of a symbol may be determined based on the relative (differential) phase of the symbol in comparison to the previous symbol. As further shown, in the case of 4QDPSK, there may be four possible symbol values (e.g., 00, 01, 10, 11) associated with a symbol, while in the case of 8DPSK, there may be eight possible symbol vlaues (e.g., 000, 001, 010, 011, 100, 101, 110, 111) associated with a symbol.

Figure 9:
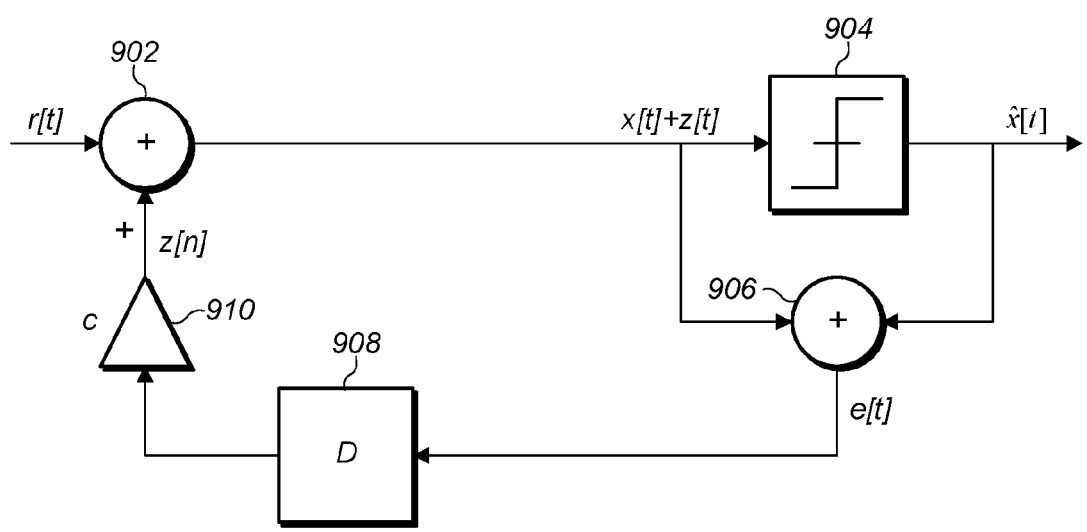
FIGS. 9-11 are circuit diagrams illustrating exemplary demodulation arrangements with various possible noise prediction schemes.

FIG. 9 illustrates an example circuit for performing non-coherent demodulation of a differentially modulated signal that utilizes noise prediction but is non-robust with respect to frequency offset effects. As shown, the circuit may receive the signal in the differentiated phase domain r[t]. This signal may be combined with the output z[n] of the noise prediction loop at combiner 902, and the resulting signal x[t]+z[t] may be provided to the slicer 904. The slicer 904 may determine the symbol value x̂[t], which may be output from the circuit as the decoded signal.

In addition, the signal x[t]+z[t] and the ideal signal for that signal as determined by the slicer 904 may be combined at combiner 906, such that the ideal signal is subtracted from the actual signal, to generate (calculate) an error signal e[t]. The error signal e[t] may be provided to a noise prediction circuit 908, which may estimate the noise conditions based on the error signal e[t] and generate a signal z[n] to be combined with the differentiated phase domain signal r[t] as previously noted. Note that, as shown, the noise preduction output signal z[n] may be (optionally) scaled according to a scaling factor 'c' using amplifier 910, e.g., to allow the amount of noise prediction feedback applied to the input signal to be scaled as desired.

Figure 10:
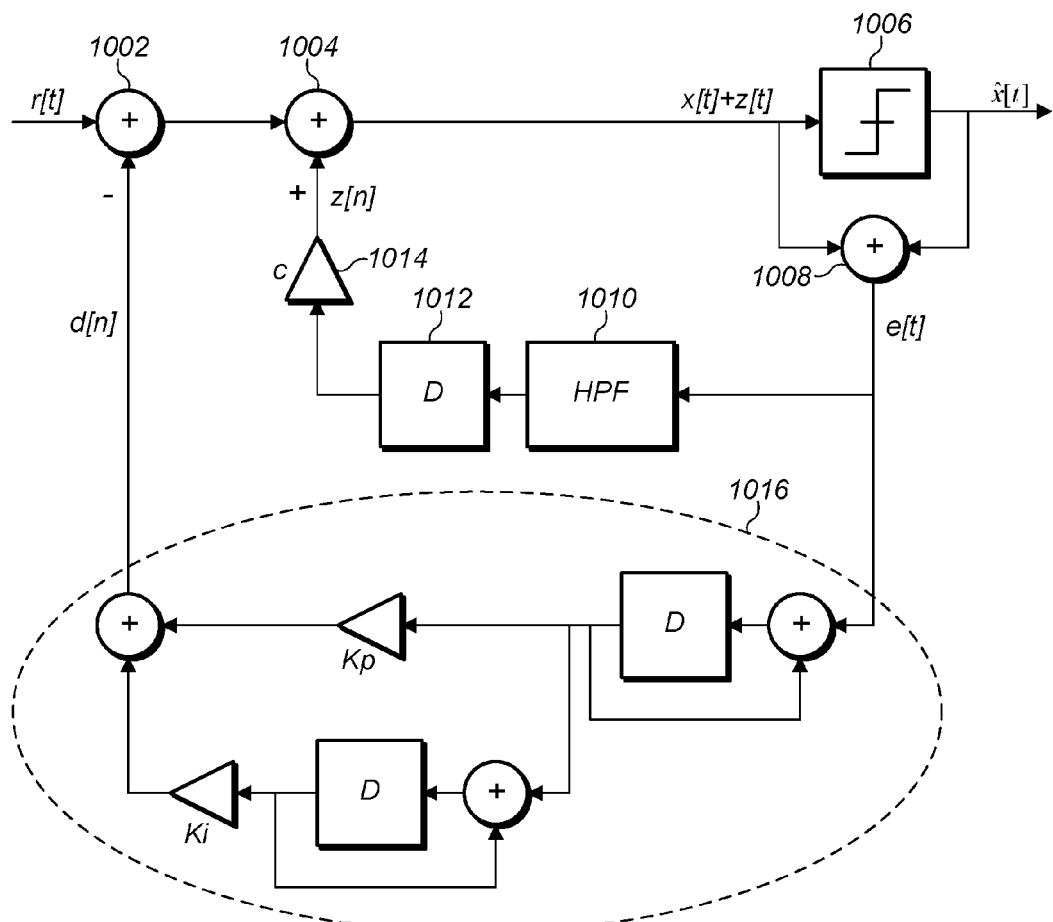

Since the circuit of FIG. 9 performs noise prediction using an unfiltered error signal, the circuit of FIG. 9 may be vulnerable to frequency offset effects, which could result in decoding errors. FIG. 10 illustrates an alternate circuit for performing non-coherent demodulation of a differentially modulated signal that utilizes noise prediction and is robust with respect to frequency offset effects.

As shown, the circuit may receive the signal in the differentiated phase domain r[t]. This signal may be combined with the output of a frequency offset estimation loop at combiner 1002 and further combined with the output d[n] of a noise prediction loop at combiner 1004, and the resulting signal x[t]+z[t] may be provided to the slicer 1006. The slicer 1006 may determine the symbol value x̂(t), which may be output from the circuit as the decoded signal.

In addition, the signal x[t]+z[t] and the ideal signal for that signal as determined by the slicer 1006 may be combined at combiner 1008, such that the ideal signal is subtracted from the actual signal, to generate (calculate) an error signal e[t]. The error signal e[t] may be provided to a noise prediction circuit 1012 by way of a high pass filter 1010. The noise prediction circuit 1012 may perform noise prediction in the high frequency domain based on the high-pass filtered error signal and generate a signal z[n] to be combined with the differentiated phase domain signal r[t] as previously noted. As shown, the noise prediction output signal z[n] may (optionally) be scaled according to a scaling factor 'c' using amplifier 1014, e.g., to allow the amount of noise prediction feedback applied to the input signal to be scaled as desired.

Further, the error signal may be provided to a frequency offset estimation circuit portion 1016, which may include multiple loops, for estimating the frequency offset of the differentially modulated signal (e.g., including constant frequency offset and frequency offset drift), with proportional (Kp) and integral (Ki) constants being used as desired to weight the amount of signal modification to be implemented to mitigate constant and time-varying frequency offset effects respectively. The frequency offset estimation circuit portion 1016 may generate a frequency offset estimation signal d[n], which may be combined with (e.g., subtracted from) the differentiated phase domain signal r[t] as previously noted.

Figure 11:
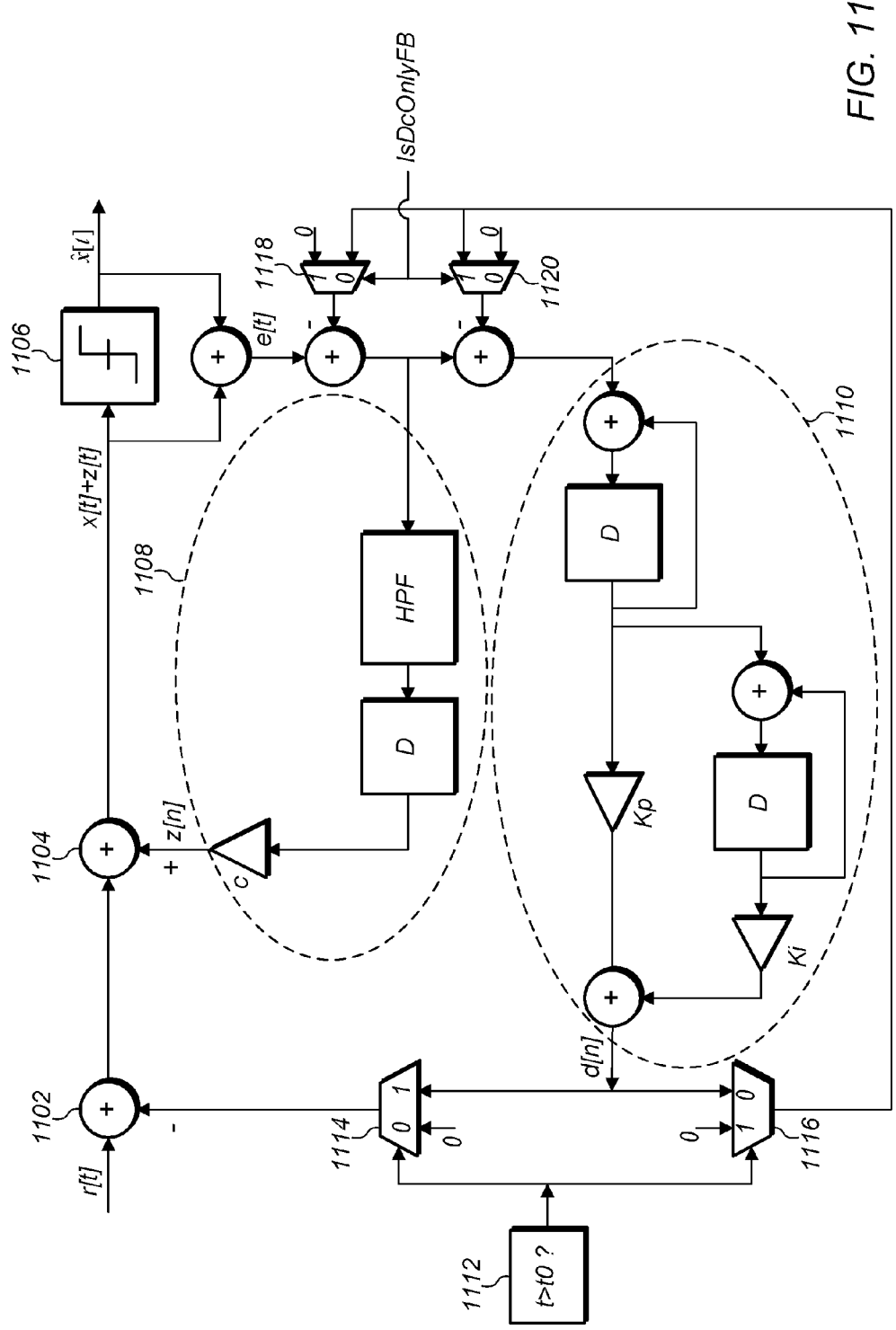

FIG. 11 illustrates a circuit for performing non-coherent demodulation of a differentially modulated signal that utilizes noise prediction and is robust with respect to frequency offset effects, similar to the circuit of FIG. 10, but additionally including circuit portions implementing a convergence condition with respect to the frequency offset estimation.

As shown, the circuit may include a slicer 1106, and a noise prediction circuit portion 1108 whose output z[n] may be combined with the differentiated phase domain signal r[t] at combiner 1104. The circuit further can include a frequency offset estimation circuit portion 1110 whose output d[n] may be combined with the differentiated phase domain signal r[t] at combiner 1102.

In addition, the circuit may utilize a timer to control when the frequency offset estimation d[n] is applied to the differentiated phase domain signal r[t]. The timer may be initiated, for example, when the error signal for the current symbol is provided to the noise prediction circuit portion 1108 and the frequency offset estimation circuit portion 1110. A time value (e.g., 't0') may be selected, and it may be determined whether the timer exceeds the selected time value (1112). The result of the determination may be provided to a pair of muxes 1114, 1116. These muxes may be configured such that if the timer exceeds the selected time value, the frequency offset estimation d[n] is output to be combined with the differentiated phase domain signal r[t] at combiner 1102, but if the timer does not exceed the selected time value, the frequency offset estimation is fed back into the error signal, either prior to being provided to both the noise prediction circuit portion 1108 and the frequency offset estimation circuit portion 1110, or after being provided to the noise prediction circuit portion 1108 but prior to being provided to the frequency offset estimation circuit portion 1110.

Whether the frequency offset estimation is fed back into the error signal before or after the noise prediction circuit portion 1108 may similarly be controlled by a pair of muxes 1118, 1120, which may be configured to feed back the frequency offset estimation at a desired location based on any of various desired conditions. For example, as one possibility (as shown), a condition on whether only DC feedback is present may be used, such that a positive result of the condition results in the frequency offset estimation being fed back into the error signal just prior to being provided to the frequency offset estimation circuit portion 1110, while a negative result of the condition results in the frequency offset estimation being fed back into the error signal prior to being provided to both the noise prediction circuit portion 1108 and the frequency offset estimation circuit portion 1110. Note that other conditions may additionally or alternatively be used in conjunction with such a circuit, as desired. Use of such convergence conditions as illustrated in the circuit of FIG. 11 and/or other conditions may allow the frequency offset estimation to converge to a stable result prior to being fed back to the differentiated phase domain signal r[t], at least according to some embodiments. Note further that, while not shown in FIG. 11, similar or different convergence conditions may also or alternatively be implemented with respect to the noise prediction circuit portion 1108, if desired.

Figure 12:
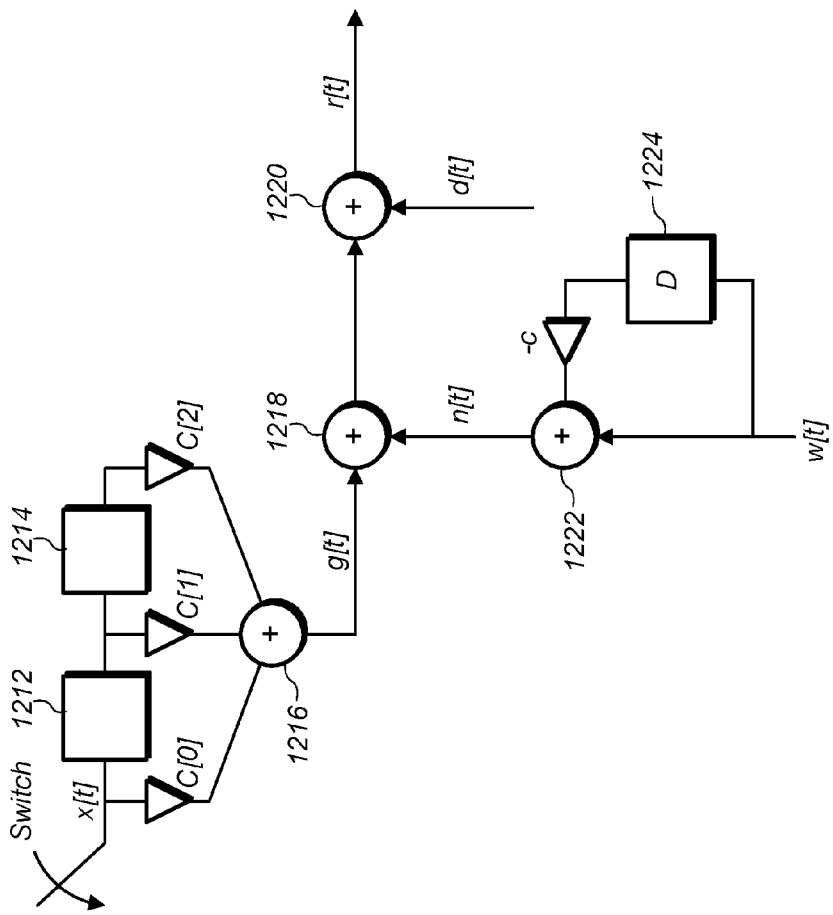
FIG. 12 is a circuit diagram illustrating a possible channel model for an exemplary possible non-coherent Bluetooth receiver that uses binary convolutional coding.
Figure 12:
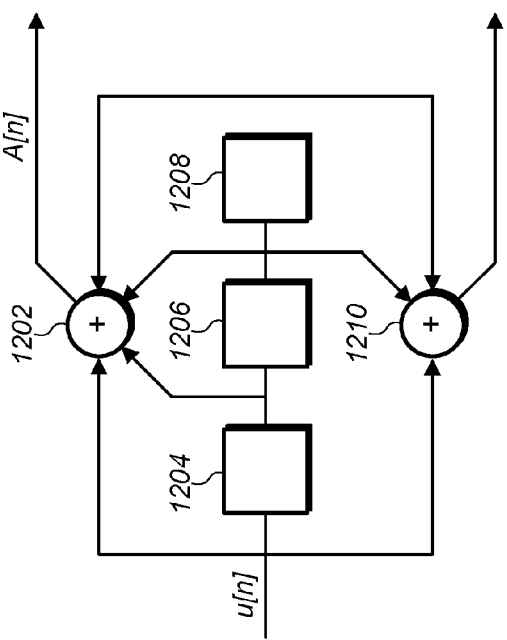
Figure 13:
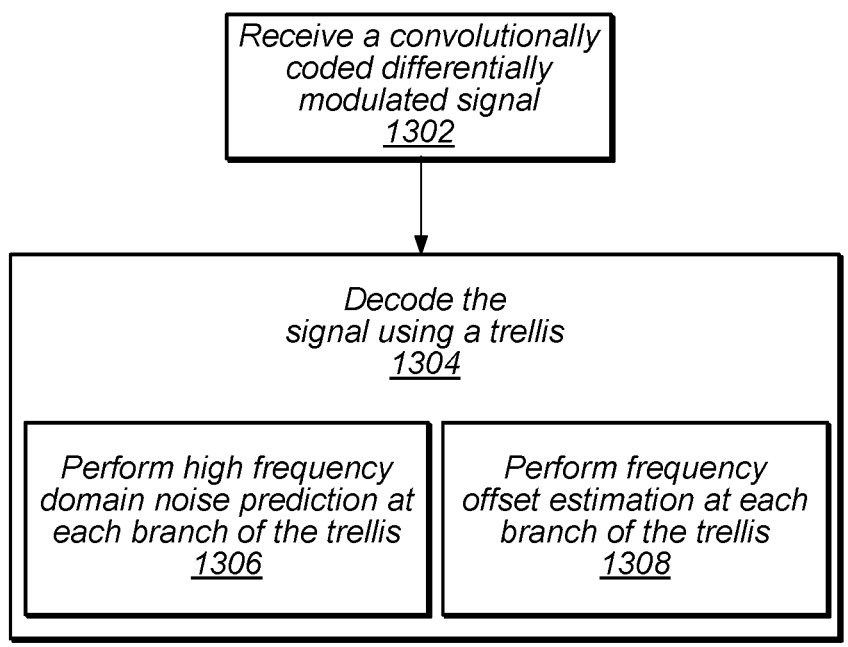
FIG. 13 is a flowchart diagram illustrating an exemplary method for performing drift robust convolutional induced reception with noise prediction.

FIGS. 12-13—Channel Model with Convolutional Coding and Drift Robust Convolutional Induced Reception Flowchart While the non-coherent demodulation techniques of FIGS. 6-11 may be used to effectively provide improved sensitivity while remaining robust to drift characteristics when the channel model supports single-shot slicer demodulation, other channel models, including channel models in which a coding scheme is implemented, are also possible. FIG. 12 illustrates one such channel model, in which the signal is subject to binary convolutional coding 1202 at the transmitter, a known inter-symbol-interference (ISI) channel, and an additive noise. The additive noise may itself be represented as the superposition of two components, including a colored noise (e.g., an outcome of a differentiation of white noise) 1204 and a slowly changing additive process (or "drift") 1206. An example of a wireless communication technique in the illustrated channel model may be applicable may include at least some frequency domain non-coherent Bluetooth receivers.

A common approach to decoding convolutional coded signals may include utilizing a version of the Viterbi algorithm, e.g., using a trellis decoder. A basic version of such an approach may be subject to a gain loss, similar to a single shot slicer approach to demodulating uncoded signals that doesn't include noise prediction. One possible improvement may include incorporating a noise prediction mechanism into the trellis. Such an approach may improve the effective receiver sensitivity, however, such a technique may be vulnerable to slowly changing frequency offset (which may translate to additive low frequency signal in the differentiated phase domain), and potentially also to constant frequency offset (which may translate to additive DC in the differentiated phase domain), such that results may suffer substantially if there is even a small amount of drift. Accordingly, a further possible improvement may include incorporating both noise prediction and frequency offset estimation into the trellis. Such a technique may be capable of providing improved receiver sensitivity with substantial robustness to drift.

Accordingly, FIG. 13 is a flowchart diagram illustrating an example method for performing drift robust convolutional induced reception with noise prediction. The method of FIG. 13 may be implemented by a wireless user equipment (UE) device or other device capable of performing communication involving decoding convolutionally coded signals, such as a device capable of performing BT communication. The method shown in FIG. 13 may be used in conjunction with any of the computer systems or devices shown in the above Figures, among other devices. Some of the method elements shown may be performed concurrently, in a different order than shown, substituted for by other elements, or may be omitted. Additional method elements may also be performed as desired. As shown, the method may operate as follows.

A differentially modulated signal may be received (1302). The differentially modulated signal may be modulated according to any of a variety of modulation techniques. For example, the differentially modulated signal may be a Bluetooth (or Bluetooth based) signal, such as a 4QDPSK EDR2 signal or a 8DPSK EDR3 signal, among various possibilities.

The differentially modulated signal may include multiple channel samples (e.g., symbols), e.g., received successively over time. For example, EDR2 and EDR3 schemes may specify communication of 1M symbols per second. Each symbol may represent one or more (e.g., depending on the modulation scheme) bit values, for example using the angular phase of the symbol relative to the previous symbol received.

The information stream represented by the differentially modulated signal may further be convolutionally coded, e.g., using binary convolutional coding (BCC) or another convolutional coding technique. Thus, the information bits of the signal may be encoded such that the signal may need to be decoded to retrieve the information bits.

Accordingly, the signal may be decoded (1304), e.g., using a trellis decoder. The trellis may have a certain number ("n") of branches, and may include a certain number of states per branch. Further, each branch of the trellis may utilize a certain number ('m') of channel samples, e.g., depending on the modulation type and coding rate used. For example, a binary phase shift keying (BPSK) modulated signal coded at a ½ rate may have 4 states and 2 channel samples per branch, as one possibility. A BPSK signal coded at a ⅛ rate may, in contrast, have 8 channel samples per branch, as one possibility. Thus, n*m channel samples may be input to the trellis, and n information bits may be output from the trellis, for each codeword of the signal, at least according to some embodiments.

According to some embodiments, decoding the signal using the trellis decoder may include (e.g., for each channel sample of the differentially modulated signal subsequent to the first channel sample) subtracting a previous channel sample of the differentially modulated signal from the current channel sample of the differentially modulated signal. The angle of difference between the two symbols (i.e., the angular domain result of the subtraction) may be compared with an ideal sample value corresponding to an edge connecting a previous state of the trellis to a current state of the trellis, for each edge and state of the trellis. The difference between this angular domain result of the subtraction and the ideal sample value may represent an error signal for the channel sample for that particular edge of the trellis.

In order to obtain noise prediction benefits while preserving robustness to frequency offset effects, one or more feedback loops may be used in conjunction with the decoding of the differentially modulated signal. As one such feedback loop, a noise prediction loop for performing noise prediction in the high frequency domain may be used (1306).

The noise prediction loop may be applied at each branch of the trellis. For example, the noise prediction loop may receive an estimated error signal associated with the current channel sample of the differentially modulated signal, perform noise prediction for the subsequent symbol of the differentially modulated signal based on the estimated error signal associated with the current channel sample, and generate a signal configured to modify the subsequent channel sample to mitigate (or reduce) noise effects in that channel sample, e.g., for each edge of the trellis. For example, the noise prediction scheme may act to 'whiten' the noise in that channel sample, e.g., to flatten the noise levels across the spectrum of that channel sample. The signal configured to modify the subsequent channel sample may be combined with the subsequent symbol (e.g., in the differentiated phase domain) of the differentially modulated signal before the subsequent symbol is sliced, for each respective edge of the trellis.

Note that, at least according to some embodiments, the estimated error signal may further be high-pass filtered (e.g., using a high-pass filter) before noise prediction is performed. This may result in the noise prediction being performed in the high frequency domain (e.g., rather than the low frequency domain or across the entire frequency range of the signal), which may (at least in some instances) help avoid increasing the susceptibility of the demodulation process to constant frequency offset and/or frequency offset drift.

For example, consider the differentially modulated signal in the differentiated phase domain. It may be the case that the constant frequency offset and frequency offset drift occur in the low frequency domain, while noise predominantly occurs in the high frequency domain. As a result, it may be possible to gain the benefit of noise prediction without exacerbating frequency offset susceptibility by utilizing a high pass filter to perform noise prediction in the high frequency domain.

As another possible feedback loop, a frequency offset estimation loop for estimating frequency offset effects on the differentially modulated signal may be used (1308), if desired. For example, while performing the noise prediction in the high frequency domain may reduce the impact of frequency offset effects from the noise prediction process, an additional frequency offset estimation loop may further reduce or nullify the effect of constant frequency offset and/or frequency offset drift when performing non-coherent demodulation of the differentially modulated signal. The frequency offset estimation loop may also be applied at each branch of the trellis.

The frequency offset estimation loop may also receive the error signal associated with the current channel sample of the differentially modulated signal. The frequency offset estimation loop may perform estimation of constant frequency offset and/or frequency offset drift, and may generate a signal configured to modify the subsequent channel sample to mitigate frequency offset effects in that channel sample, for each edge of the trellis. The signal configured to modify the subsequent channel sample may be combined with the subsequent channel sample (e.g., in the differentiated phase domain) of the differentially modulated signal before the subsequent symbol is sliced, for each respective edge of the trellis.

Note that one or more convergence conditions may be used in conjunction with either or both of the noise prediction loop and the frequency offset estimation loop, as desired. For example, a timer (or multiple timers) may be used to cause the noise prediction loop and/or the frequency offset estimation loop to wait a certain amount of time after receiving the error signal for the current channel sample prior to modifying the subsequent channel sample, e.g., in order to allow sufficient time for the noise prediction and/or frequency offset estimation to converge to stable results.

Thus, as the noise prediction and frequency offset estimation loops may be applied to the channel sample(s) used to calculate the error signals for each edge, their effects may also effectively be applied to the error signal calculation for each edge.

At each state of the trellis, a surviving bit sequence may be selected from two candidate bit sequences, including a first candidate bit sequence associated with a first edge connecting a first previous state of the trellis to the current state and a second candidate bit sequence associated with a second edge connecting a second previous state of the trellis to the current state. Each respective edge's candidate bit sequence may represent a bit associated with the respective edge, appended to a bit sequence associated with the previous state the respective edge connects to the current state. The surviving bit sequence may be selected based on which is smaller among a distance metric candidate for the first edge and a distance metric candidate for the second edge. For example, the surviving bit sequence may be the bit sequence associated with the edge having the smaller distance metric value.

The distance metric candidate for each respective edge may be computed based at least in part on a distance metric value associated with the previous state that the respective edge connects to the current state. That distance metric value may represent a summation of accumulated absolute values of error signals through that state of the trellis, according to some embodiments. Additionally, the distance metric candidate for each respective edge may be computed based at least in part on the error signal(s) for the channel samples associated with that edge. For example, the distance metric candidate for the first edge may be calculated as a sum of the distance metric value for the first previous state of the trellis and a summation of absolute values of the error signals for each channel sample associated with the first edge, while the distance metric candidate for the second edge may be calculated as a sum of the distance metric value for the second previous state of the trellis and a summation of absolute values of the error signals for each channel sample associated with the second edge, as one possibility.

In addition to determining the surviving bit sequence, state information for some or all of the distance metric, the noise prediction loop, and/or the frequency estimation loop may be determined for each state of the trellis. For example, the distance metric candidate associated with the surviving bit sequence of a given state may be selected as the distance metric value for the given state. Likewise, noise prediction state information for the edge associated with the surviving bit sequence of a given state may be selected as noise prediction state information for the given state, and may be used for the noise prediction loop going forward from the given state (e.g., for each edge leading from the given state to a subsequent state of the trellis). Similarly, frequency offset estimation state information for the edge associated with the surviving bit sequence of a given state may be selected as frequency offset estimation state information for the given state, and may be used for the frequency offset estimation loop going forward from the given state.

Thus, the techniques described herein may be used to incorporate noise prediction and frequency offset estimation steps at each branch of a trellis, and thus to decode a convolutionally coded and differentially modulated signal to produce an information bit stream at the device receiving the signal. At least according to some embodiments, the bit stream may be subject to fewer errors and/or may be produced with less power consumption than might otherwise occur, as a result of utilizing noise prediction and as a result of utilizing frequency offset estimation, to obtain the noise prediction gain while preserving robustness to frequency offset effects.

Figure 14:
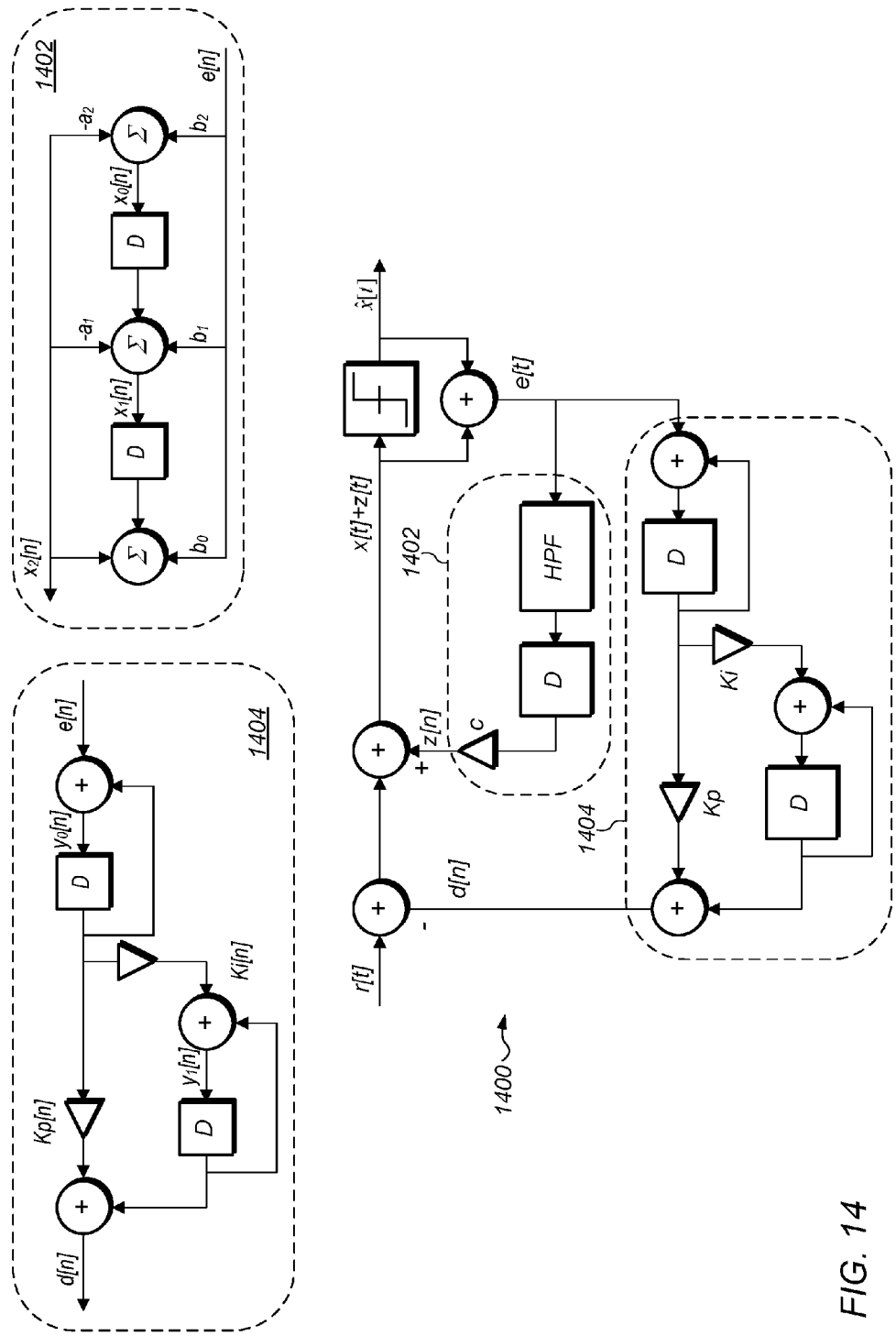
FIG. 14 is a circuit diagram illustrating exemplary details of a possible noise prediction loop and a possible frequency offset estimation loop.

FIG. 14—Noise Prediction Loop and Frequency Offset Estimation Loop Details

FIG. 14 is a circuit diagram illustrating possible details of a noise prediction loop and a frequency offset estimation loop, e.g., that could be used in conjunction with the method of FIG. 6 and/or the method of FIG. 13. As shown, the circuit 1400 may include a noise prediction loop portion 1402 and a frequency offset estimation portion 1404.

Each loop may include intermediate states. For example, as shown, intermediate to the input signal e[n] and the output signal $x_2[n]$, the noise prediction loop 1402 may include an $x_0[n]$ state and a $x_1[n]$ state. The noise prediction loop state may thus be given as a vector:

$$x[n]=[x_2[n],x_1[n],x_0[n]]^T$$

Further, the effect of the noise prediction loop may be expressed as:

$$x[n]=A_1x[n-1]+b_1e[n]$$

where:

$$A_1 \triangleq \begin{bmatrix} 0 & 1 & 0 \\ 0 & -a_1 & 1 \\ 0 & -a_2 & 0 \end{bmatrix}$$

$$b_1 \triangleq \begin{bmatrix} b_0 \\ b_1 - a_1 b_0 \\ b_2 - a_2 b_0 \end{bmatrix}$$

Thus, at each iteration, the result of the noise prediction loop 1402 may depend on the noise prediction loop state of the previous iteration.

As additionally shown, intermediate to the input signal e[n] and the output signal d[n], the frequency offset estimation loop 1404 may include a $y_0[n]$ state and a $y_1[n]$ state. For this loop, the effect may be expressed as:

$$d[n]=K[n]y[n-1]$$

where:

$$y[n] = A_2 y[n-1] + b_2 e[n]$$

$$A_2 \triangleq \begin{bmatrix} 1 & 1 \\ 1 & 0 \end{bmatrix}$$

$$b_2 \triangleq \begin{bmatrix} 0 \\ 1 \end{bmatrix}$$

$$K[n] \triangleq \begin{bmatrix} K_i[n] \\ K_p[n] \end{bmatrix}$$

Thus, at each iteration, the result of the frequency offset estimation loop 1404 may also depend on the frequency offset estimation loop state of the previous iteration.

FIGS. 15-19—Trellis Example

Figure 15:
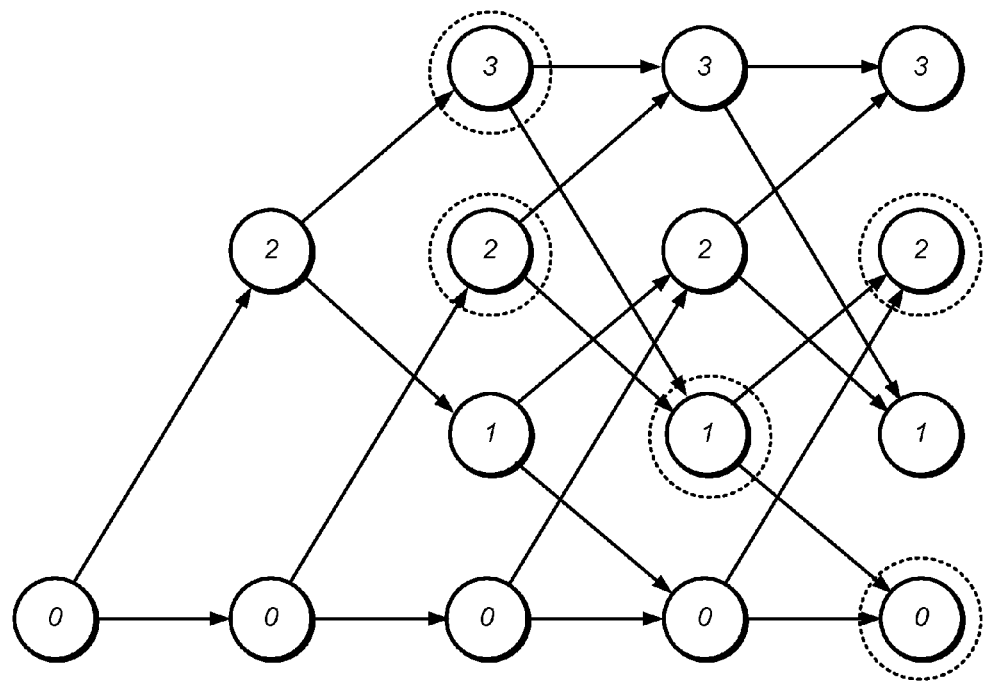
FIG. 15 illustrates an exemplary possible embodiment of a trellis.
Figure 16:
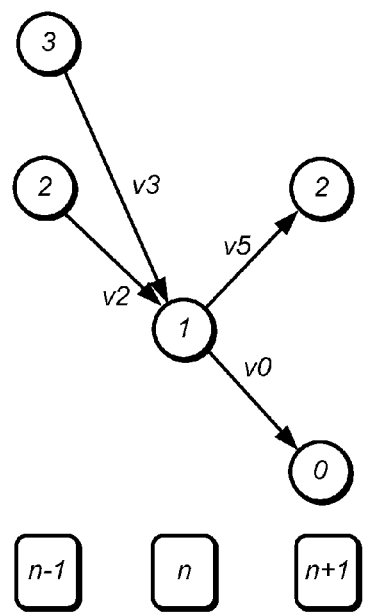
FIGS. 16-19 illustrate extracted portions of the trellis of FIG. 15 including various calculations and state information for the illustrated portions for performing drift robust convolutional induced reception with noise prediction.

FIG. 15 illustrates an initial portion of one possible example of a trellis decoder. For illustrative purposes, a specific selection of the trellis (i.e., the states highlighted with large circles, along with the edges or vertices connecting those edges) is extracted and shown separately in FIG. 16. Thus, states 2 and 3 of step n−1 of the trellis are connected to state 1 of step n of the trellis via vertices v2 and v3 respectively, while state 1 of step n of the trellis is in turn connected to states 0 and 2 of step n+1 of the trellis via vertices v0 and v5 respectively.

Figure 17:
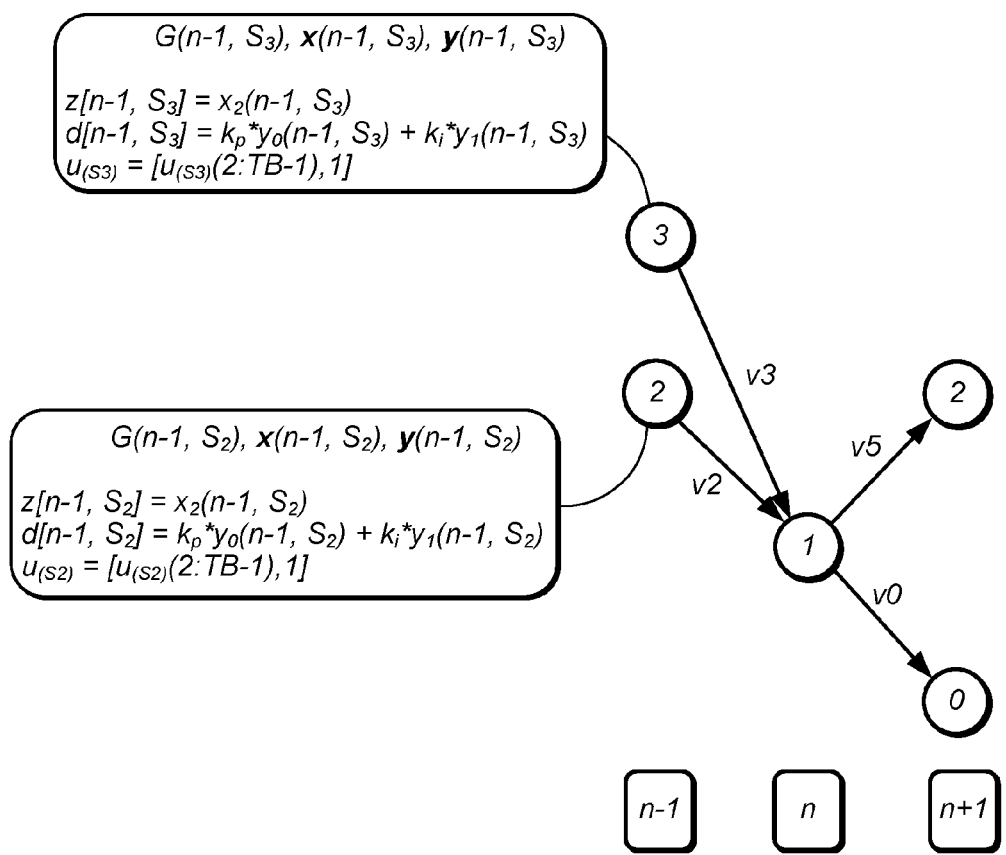

FIG. 17 illustrates the same specific trellis portion, including callouts illustrating state information for the states 2 and 3 of step n−1. As shown, each state may include state information for a distance metric (e.g., $G(n-1,S_2)$ and $G(n-1,S_3)$), noise prediction loop state information (e.g., $x(n-1,S_2)$ and $x(n-1,S_3)$), and frequency offset estimation loop state information (e.g., $y(n-1,S_2)$ and $y(n-1,S_3)$). The noise prediction loop state information may be used to determine a noise prediction modification to a next channel sample and the frequency offset estimation loop state information may be used to determine a frequency offset estimation modification to a next channel sample, for each edge exiting each state.

Figure 18:
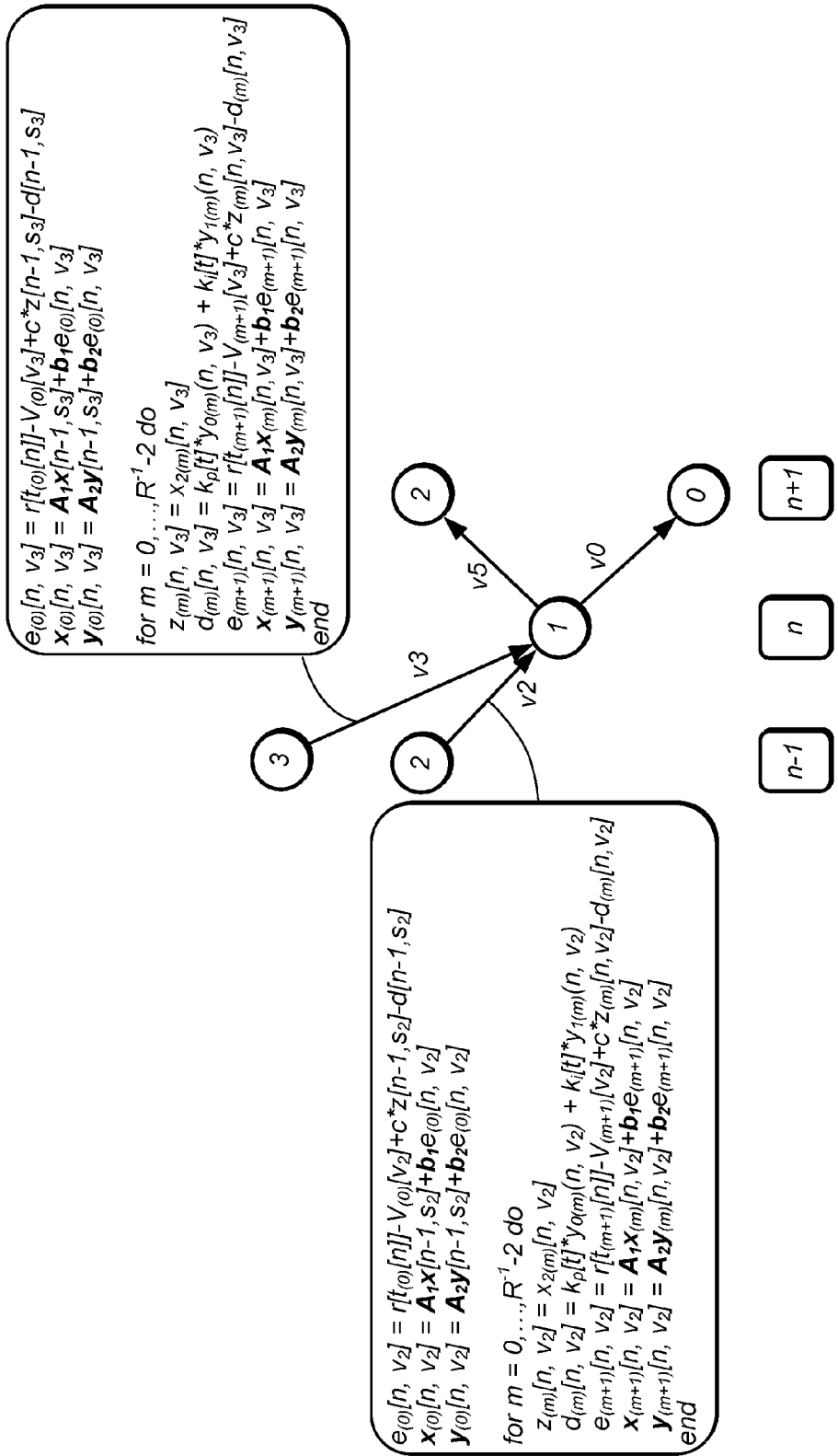

FIG. 18 illustrates the same trellis portion, but in this case including callouts illustrating calculations performed for the edges v2 and v3 that connect the states 2 and 3 of step n−1, respectively, to the state 1 of step n. As shown, for each edge, an error signal for an initial channel sample for the edge may be calculated, as well as noise prediction loop state information and frequency offset estimation loop state information for the initial channel sample for the edge, using the noise prediction loop state information and frequency offset estimation loop state information for the previous state that the edge connects to the state 1 of step n. The error signal calculation for the subsequent channel sample for the edge (e.g., as well as noise prediction loop state information and frequency offset estimation loop state information determinations) may then utilize the noise prediction loop state information and frequency offset estimation loop state information for the initial channel sample for the edge. The process may continue iteratively through the remainder (if any) of the channel samples for the edge.

Figure 19:
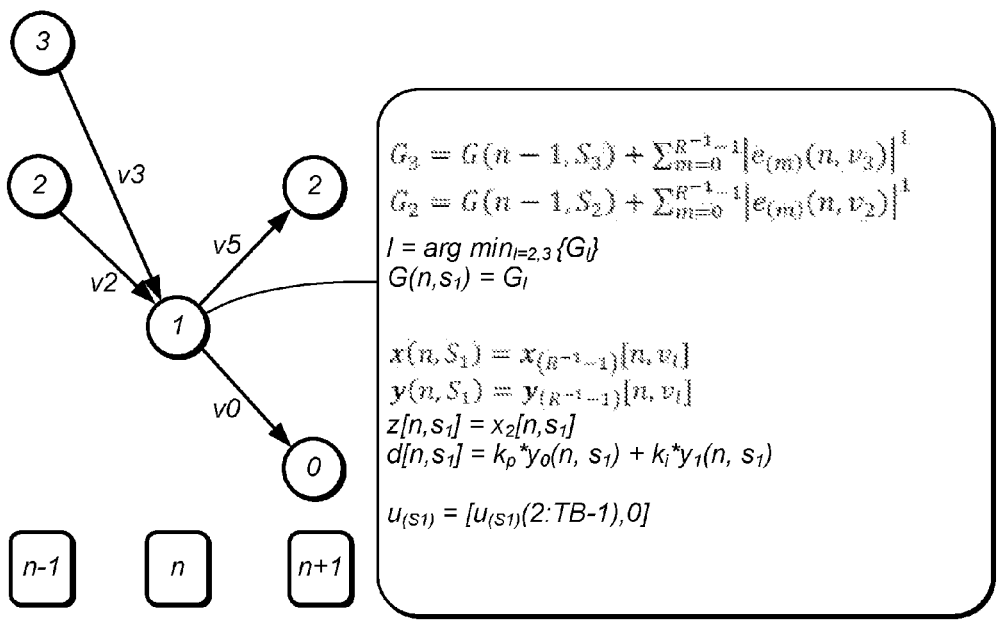

FIG. 19 further illustrates the same trellis portion, but in this case including a callout illustrating calculations performed for determining a surviving edge and associated state information for the state 1 of step n, e.g., based on the calculations performed for each edge as illustrated in FIG. 18. As shown, a distance metric candidate for v2 may be calculated based on the distance metric value for state 2 of step n−1 and based on a summation of the absolute values of the error signals for the channel samples of v2:

$$G_2=G(n-1,S_2)+\Sigma_{m=0}^{R-1}|e_{(m)}(n,v_2)|^1$$

Similarly, a distance metric candidate for v3 may be calculated based on the distance metric value for state 3 of step n−1 and based on a summation of the absolute values of the error signals for the channel samples of v3:

$$G_3=G(n-1,S_3)+\Sigma_{m=0}^{R-1}|e_{(m)}(n,v_3)|^1$$

The minimum (e.g., the distance metric candidate with the smaller value) among $G_2$ and $G_3$ may be selected as the distance metric value for state 1 at step n:

$$l = \text{argmin}_{I=2,3}\{G_I\}$$

$$G(n, S_1) = G_l$$

Additionally, the accumulated bit sequence associated with the edge corresponding to the winning distance metric candidate may be selected as the surviving bit sequence for state 1 at step n. Further, the noise prediction loop state information for state 1 at step n may be set as the noise prediction loop state information for the last channel sample for the edge associated with the winning distance metric candidate:

$$x(n, S_1) = x_{(R^{-1}-1)}[n, v_l]$$

Similarly, the frequency offset estimation loop state information for state 1 at step n may be set as the frequency offset loop state information for the last channel sample for the edge associated with the winning distance metric candidate:

$$y(n, S_1) = y_{(R^{-1}-1)}[n, v_l]$$

This state information for state 1 at step n may be used in a similar fashion for edge v0 connecting state 1 at step n to state 0 at step n+1, and for edge v5 connecting state 1 at step n to state 2 at step n+1. Further, similar techniques may be used throughout the trellis for determining the surviving bit sequence and state information at each state of the trellis, and eventually for determining a final surviving bit sequence at completion of decoding a codeword by the trellis.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a wireless device) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

While examples have been provided above that relate to Bluetooth, it should be understood that the techniques described herein may also be used, mutatis mutandis, in the context of any other appropriate wired or wireless communications technology, including but not limited to cellular, IEEE 802.11, Bluetooth Low Energy, or other technologies. Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A wireless device, comprising:
   an antenna;
   a radio operatively coupled to the antenna; and
   a processing element operatively coupled to the radio;
   wherein the wireless device is configured to:
      wirelessly receive a convolutionally coded and differentially modulated signal comprising a plurality of channel samples; and
      decode the differentially modulated signal using a trellis,
      wherein the wireless device comprises a noise prediction loop configured to reduce noise characteristics of the differentially modulated signal,
      wherein the wireless device further comprises a frequency offset estimation loop configured to reduce a frequency offset drift of the differentially modulated signal,
      wherein the noise prediction loop and the frequency offset estimation loop are applied at each edge of the trellis.

2. The wireless device of claim 1, wherein the wireless device is further configured to:
   determine a surviving bit sequence at each state of the trellis by selecting the surviving bit sequence from a first candidate bit sequence and a second candidate bit sequence; and
   determine an error signal associated with the first candidate bit sequence and an error signal associated with the second candidate bit sequence,
   wherein the noise prediction and frequency offset estimation are applied to each of the error signal associated with the first candidate bit sequence and to the error signal associated with the second candidate bit sequence, and
   wherein selecting the surviving bit sequence is based at least in part on the error signal associated with the first candidate bit sequence and the error signal associated with the second candidate bit sequence.

3. The wireless device of claim 2, wherein the wireless device is further configured to:
   store surviving noise prediction loop state information and surviving frequency offset estimation loop state information at an edge of the trellis,
   wherein the surviving noise prediction loop state information and surviving frequency offset estimation loop state information for the edge of the trellis comprise noise prediction loop state information and frequency offset estimation loop state information associated with the surviving bit sequence for the edge of the trellis.

4. The wireless device of claim 1,
   wherein, at an edge of the trellis, the noise prediction loop performs noise prediction for a next channel sample of the differentially modulated signal based at least in part on a high-pass filtered error signal associated with a current channel sample of the differentially modulated signal and modifies the next channel sample based at least in part on a result of the noise prediction.

5. The wireless device of claim 1,
   wherein, at an edge of the trellis, the frequency offset estimation loop performs frequency offset estimation for a next channel sample of the differentially modulated signal based at least in part on a non-high-pass filtered error signal associated with a current channel sample of the differentially modulated signal and modifies the next channel sample based at least in part on a result of the frequency offset estimation.

6. The wireless device of claim 1, wherein the differentially modulated signal comprises a Bluetooth signal.

7. A method, comprising:
at a wireless device:
receiving a convolutionally coded and differentially modulated signal; and
decoding the signal using a trellis, wherein decoding the signal using the trellis comprises:
computing error signals for each of a plurality of channel samples associated with a first edge connecting a first previous state of the trellis to a given state in the trellis, wherein each error signal is computed using a noise prediction loop and a frequency offset estimation loop;
computing a first distance metric candidate for the first edge, wherein the first distance metric candidate is computed based at least in part on a distance metric value for the first previous state of the trellis and on a summation of absolute values of the error signals for each of the plurality of channel samples associated with the first edge;
computing error signals for each of a plurality of channel samples associated with a second edge connecting a second previous state of the trellis to the given state in the trellis, wherein each error signal is computed using the noise prediction loop and the frequency offset estimation loop;
computing a second distance metric candidate for the second edge, wherein the second distance metric candidate is computed based at least in part on a distance metric value for the second previous state of the trellis and on a summation of absolute values of the error signals for each of the plurality of channel samples associated with the second edge; and
selecting a minimum of the first distance metric candidate and the second distance metric candidate to be a distance metric value of the given state.

8. The method of claim 7, further comprising:
determining a surviving bit sequence for the given state based at least in part on whether the first distance metric candidate or the second distance metric candidate is selected to be the distance metric value of the given state.

9. The method of claim 7, further comprising:
determining surviving noise prediction state information for the noise prediction loop for the given state based at least in part on whether the first distance metric candidate or the second distance metric candidate is selected to be the distance metric value of the given state.

10. The method of claim 7, further comprising:
determining surviving frequency offset estimation state information for the frequency offset estimation loop for the given state based at least in part on whether the first distance metric candidate or the second distance metric candidate is selected to be the distance metric value of the given state.

11. The method of claim 7, wherein decoding the signal using the trellis further comprises:
performing said computing and selecting steps for each state of the trellis.

12. The method of claim 7, wherein the signal is differentially modulated using binary phase shift keying (BPSK) and convolutionally coded at a ½ rate, wherein 2 channel samples are associated with the first edge and the second edge.

13. The method of claim 7, wherein the signal is differentially modulated using binary phase shift keying (BPSK) and convolutionally coded at a ⅛ rate, wherein 8 channel samples are associated with the first edge and the second edge.

14. An integrated circuit, comprising:
a trellis decoder circuit portion configured to determine an information bit sequence from a convolutionally coded and differentially modulated signal;
an error estimation circuit portion configured to calculate estimated error signals for channel samples at each state of the trellis decoder;
a noise prediction circuit portion configured to perform noise prediction using the estimated error signals for channel samples at each state of the trellis decoder; and
a frequency offset estimation circuit portion configured to estimate frequency offset using the estimated error signals for channel samples at each state of the trellis decoder.

15. The integrated circuit of claim 14, wherein the trellis decoder circuit portion is further configured to determine a surviving bit sequence at each state of the trellis by selecting the surviving bit sequence from a first candidate bit sequence and a second candidate bit sequence,
wherein the error estimation circuit portion is further configured to calculate estimated error signals associated with the first candidate bit sequence and estimated error signals associated with the second candidate bit sequence, and
wherein the surviving bit sequence is determined based at least in part on the error signal associated with the first candidate bit sequence and the error signal associated with the second candidate bit sequence.

16. The integrated circuit of claim 15, wherein the trellis decoder circuit portion is further configured to store surviving noise prediction loop state information and surviving frequency offset estimation loop state information at each state of the trellis,
wherein the surviving noise prediction loop state information and surviving frequency offset estimation loop state information for a given state of the trellis comprise noise prediction loop state information and frequency offset estimation loop state information associated with the surviving bit sequence for the given state of the trellis.

17. The integrated circuit of claim 16, wherein the trellis decoder circuit portion is further configured to use the surviving noise prediction loop state information and surviving frequency offset estimation loop state information for the given state as noise prediction loop state information and frequency offset estimation loop state information for edges connecting the given state of the trellis to subsequent states of the trellis.

18. The integrated circuit of claim 14, wherein the integrated circuit further comprises:
a high pass filtering circuit portion configured to perform high pass filtering of the estimated error signals;
wherein the noise prediction circuit portion is further configured to perform the noise prediction based on the estimated error signal after the high pass filtering.

19. The integrated circuit of claim 18,
wherein the noise prediction circuit portion is further configured to feed back a result of the noise prediction for each channel sample to whiten noise effects in a subsequent channel sample.

20. The integrated circuit of claim 14,
wherein the frequency offset estimation circuit portion is further configured to feed back a result of the frequency offset estimation for each channel sample to reduce frequency offset effects in a subsequent channel sample.

\* \* \* \* \*